Jan. 13, 1970

N. C. JØRGENSEN

Re. 26,766

APPARATUS FOR HEATING AND SETTING HAIR

Original Filed April 22, 1963

United States Patent Office

Re. 26,766

Reissued Jan. 13, 1970

26,766

APPARATUS FOR HEATING AND SETTING HAIR

Niels Christian Jorgensen, Copenhagen, Hellerup, Denmark, assignor to Arne B. Pedersen, Bryggergarden, Kalundborg, Denmark Original No. 3,257,541, dated June 21, 1966, Ser. No. 274,506, Apr. 22, 1963. Application for reissue June 2, 1967, Ser. No. 653,582

Int. Cl. H05b *1/00;* A45d *2/10, 4/16*

U.S. Cl. 219—222 18 Claims

Matter enclosed in heavy brackets [ ] appears in the original patent but forms no part of this reissue specification; matter printed in italics indicates the additions made by reissue.

The invention relates to methods and apparatus for heating a hair winder for use in drying and curling hair and of the kind consisting of a preferably cylindrical heat-accumulating container which is filled with a heat-absorbing material.

Methods of the aforesaid kind are known and they consist usually in placing a hair winder in a heated space or immersing it into a heated liquid. In both cases the hair winder is heated from its outer surface, which is inconvenient, in particular because the container is usually made of a heat insulating material such as plastic, partly in order to permit the hair winder to release its accumulated heat relatively slowly and partly in order to prevent the surface of the hair winder from attaining a temperature so high that there would be danger of a burn if it is contacted by the hands and the scalp. In this case it is advantageous that the plastic material is only slow in transmitting heat to the hair winder to substitute that given off by contact.

In another known method the hair winder is heated by means of an eletric heating element provided in same, connected through outer feeding wires with a voltage source. However, it is, in the first place, difficult to ensure that the heating element receives just the necessary electric energy to produce the predetermined temperature in the surface of the hair winder, and, in the second place the heating element occupies a substantial part of the inner space of the container, which space could effectively be at least partly occupied by a material having a greater specific heat than that of the electric heating element.

It is an object of the invention to device a method having none of the aforesaid drawbacks and an essential feature of the method according to the invention is that a surface provided in the interior of the hair winder is brought into direct contact with another, metallic surface provided outside the hair winder and heated by electric or other heat producing means for such a period that the container and the heat-absorbing material enclosed in same have been heated to a predetermined temperature, after which the contact is interrupted and the hair winder is ready for use.

As a result, the hair winder is internally heated in simple and reliable manner without the use of a built-in electric heating element which has to be connected to a voltage source by outer wires, and both the hair winder and the heat-producing means will thereby be very simple and cheap to manufacture.

The invention is furthermore concerned with a hair winder for use in carrying the method according to the invention into effect and an essential feature of a hair winder according to the invention is that there is provided a metallic sleeve in the interior of the hair winder, the inner surface of the said sleeve being designed for effective contact with another metallic surface provided outside the hair winder, whereas the outer surface of the sleeve is in intimate contact with the heat-absorbing material.

As a result, the hair winder may be quickly heated to a predetermined temperature, and experience has shown that an inner temperature of about 60–120° C. and a temperature of about 40–60° C. on the outer surface of the hair winder are suitable, the last-mentioned temperature being selected with a special view not to damage the hair by the heating.

In another embodiment of the hair winder according to the invention the inner surface of the sleeve is conical and the other metallic surface provided outside the hair winder is formed as a corresponding conical surface on a metallic pin, whereby intimate contact between the two heat exchanging surfaces is obtained.

The sleeve and the metallic pin are preferably made of aluminum, as a result of which the two heat exchanging surfaces are not oxidized to any essential degree, which would increase the thermal resistance to the heat transmission and delay the heating of the hair winder.

In assembly, when the conical sleeve is introduced into the container, it forces the heat-absorbing material both against the outer surface of the sleeve and against the inner wall of the container, whereby the thermal resistance between the sleeve and the wall of the container is reduced so that the heating of the hair winder is accelerated.

Preferably the sleeve is introduced through one open end of the container and provided with a flange for closing the said end, as a result of which the container may be effectively closed in simple manner after being filled with the heat-absorbing material.

The metallic pin is in heat exchanging relation with an electric heating element, as a result of which the temperature of the metallic pin may be regulated by varying the current supply to the electric heating element.

The electric heating element is connected in a series with a thermostat which is in heat-transmitting connection with the casing of the heating element and so dimensioned and adjusted that the thermostat cuts off the supply of an electric current to the heating element when at least one of the pins provided on the heating element has attained such temperature that the hair winder placed on the said pin has attained the predetermined temperature. As a result, the hair winder is not subjected to excessive temperatures which, for example, might deteriorate the properties of the absorbing material or damage the material of the container.

The container is provided on its outer surface with a layer of a heat-sensitive pigment which changes color at a surface temperature corresponding to the predetermined inner temperature, whereby a simple criterion is obtained, showing that the interior of the hair winder has attained the predetermined temperature.

The heat-absorbing material is of the kind having a melting point approximately in the range of 60–130° C. and a high heat of fusion of the order of 40–80 cal./g., such as erythrite.

As a result, the hair winder may, when heated to a temperature slightly above the said melting point, accumulate a substantially larger amount of heat, namely the heat of fusion the heat-absorbing material, which amount of heat will be released when the hair winder is cooled during operation and the heat-absorbing material solidifies again.

The outer cylindrical surface of the container is preferably provided with corrugations along the outer circumference of the container such as coaxial, annular or helical projections of triangular, trapezoidal or corrugated cross-section as a result of which the heat-transmitting surface of the container is increased very substantially so that it will more readily establish contact with a large part of the hair wound on the hair winder.

The invention will now be further described with reference to the drawing, in which FIGURE 1 shows an embodiment of a hair winder according to the invention, as seen in diametral section.

Figure 1:
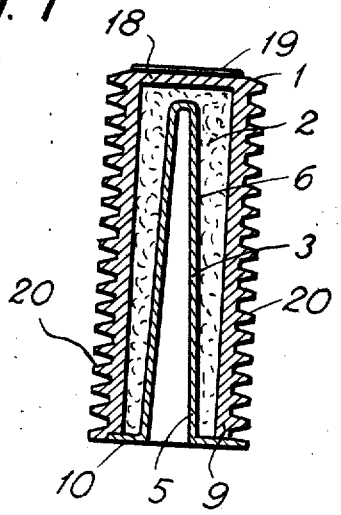
Figure 2:
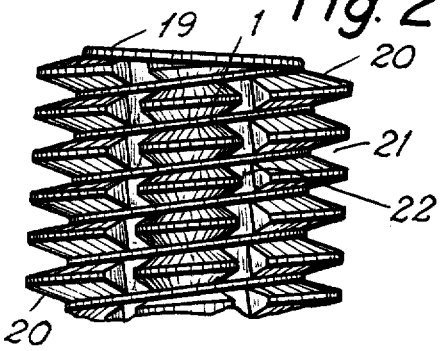
FIGURE 2 is a part of the embodiment of FIG. 1 as viewed from the side.
Figure 3:
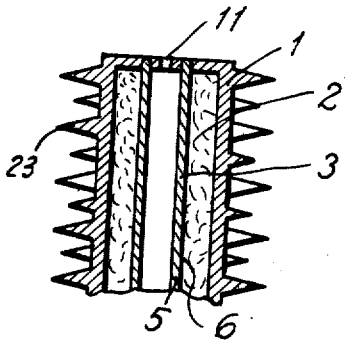
FIGURE 3 shows a part of another embodiment of the hair winder according to the invention, viewed in a diametrical section, and FIGURE 4 an apparatus for carrying the method according to the invention into effect and for heating a hair winder according to the invention.

FIGURES 1, 2 and 3 of the drawing show embodiments of a hair winder for use in drying and curling hair and of the kind consisting of a preferably cylindrical heat-accumulating container 1 which is partly filled with a heat-absorbing material 2. A surface 3 of a sleeve 5 which is provided in the interior of the hair winder is brought into direct contact with another, metallic surface 4 supported outside the hair winder and heated by electric or other heat-producing means for such a period that the container 1 and the heat-absorbing material 2 enclosed therein have been heated to a predetermined temperature, such as 60–130° C., after which the contact is interrupted and the hair winder is ready for use, to be wound with a lock of hair which is to be dried and curled. The container 1 may be of metal or plastic, the last-mentioned material being preferred since, owing to its low coefficient of thermal conductivity it causes a more slow cooling of the hair winder and provides a lower surface temperature such as 40–60° C., which has been found suitable for a sufficiently quick evaporation of the moisture content of the hair wound upon the hair winder without the said hair being damaged by excessive heating.

Figure 4:
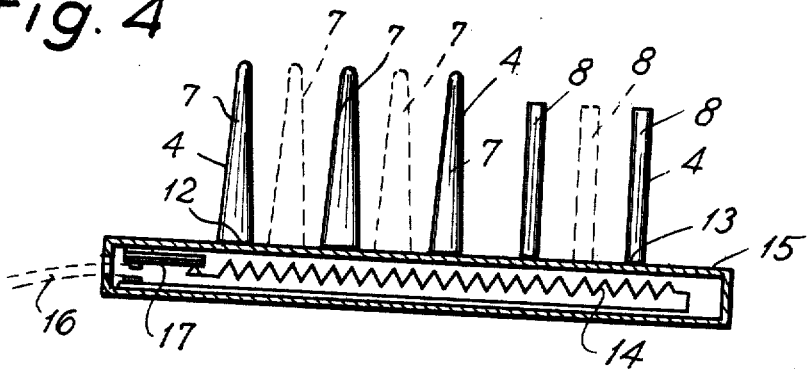

The inner surface 3 of the sleeve 5 is designed with a view to establish effective contact with metallic surface 4 when the winder is placed over the surface 4. The outer surface 6 of the sleeve 5 is in contact with the heat-absorbing material 2. The inner surface 3 of the sleeve 5 may in a convenient embodiment of the hair winder according to the invention as shown in FIGURE 1 be conical, and the other metallic surface 4 be formed as a corresponding conical surface of a metallic pin 7 as indicated in FIGURE 4, but the inner surface 3 of the sleeve 5 may alternatively be cylindrical as shown in FIGURE 3 in which case the surface 4 is formed on a cylindrical pin 8 which is likewise shown in FIGURE 4. The outer surface 6 of the sleeve 5 may be formed with a conical surface as shown in FIGURE 1, but may alternatively be cylindrical as shown in FIGURE 3. In a suitable embodiment of the hair winder according to the invention the sleeve 5 is introduced into the container 1 through the one open end part 9 of the container and is provided with a flange 10 for closing the said end part 9 after the heat-absorbing material 2 has been introduced into the container 1. It will be appreciated that the sleeve 5 may, regardless of whether its inner surface 3 is conical or cylindrical, be provided at the end remote from the flange 10 with an opening 11 as shown in FIGURE 3, which opening provides a passage between the interior of the sleeve and the outer surface of the container for the escape of air from the interior of the sleeve when the sleeve is mounted on the pins 7 or 8. These pins 7 and 8, and the sleeve S may suitably be of aluminum. The pins 7 and 8 have one end part 12 and 13 in heat-transferring connection with the outer casing 15 of an electric heating element 14 as shown in FIGURE 4. The electric heating element 14 may be connected to a source of electricity by means of a supply wire 16 and is connected in series with a thermostat 17 in heat-transmitting connection with the casing 15 of the heating element 14, the said thermostat being so dimensioned and adjusted that it cuts off the supply of electric current to the heating element when at least one of the pins 7, 8 provided on the casing 15 has attained such temperature that the hair winder placed on the pin 7, 8 has attained a predetermined inner temperature of about 60–130° C. The other end part 14 of the container 1 may in one embodiment of the hair winder according to the invention be provided on its outer surface with a layer 19 of a heat-sensitive pigment having a color change corresponding substantially to the surface temperature of the container when the interior of the container has the fixed temperature within the range 60–130° C. The heat-absorbing material 2 provided in the space between the sleeve 5 and the container wall 1 may in one embodiment of the hair winder according to the invention be of the kind having a melting point in the range of about 60–130° C. and a high of heat fusion, such as erythrite, which has a melting point of about 120° C. and a heat of fusion of about 80 cal./g.

The substantially cylindrical outer surface of the container 1 may in one embodiment of the hair winder according to the invention be provided with corrugations extending along the outer circumference of the container such as coaxial, annular or helical projections of triangular, corrugated or trapezoidal cross-section as indicated in FIGURES 1 and 2 for increasing the effective heat-transmitting surface of the container, the said surface resting in contact with wound hair provided in spaces 21 between the projections. To enable the hair to be more freely wound without necessarily causing it to lie in extension of the same space 21, the projections may be provided with grooves 22 extending in the axial direction of the hair winder and forming passages between spaces 21. The casting mould for the form of hair winder which is shown in FIGURES 1 and 2 may be made by means of known machine tools, and the grooves may easily be produced by means of lists inserted in the mould. The grooves 22 may if desired, be used for guiding hairpin-shaped clips which retain the hair during drying or curling. Incidentally, the cylindrical surface of the container may alternatively in a manner known per se be provided with points 23 as indicated in FIGURE 3, these points may be of varying length and be unevenly distributed over the surface and be cast integral with the material of the container. Such points 23 will, however, have less of their surface in contact with the hairlock than, for example, the corrugations shown in FIGURES 1 and 2.

What I claim and desire to be secured by Letters Patent is:

1. Apparatus for applying heat to hair, said apparatus comprising a heating member having a smooth outer surface, means connected to said heating member to heat the same, a hair winder adapted for being heated by the thus heated member for transferring heat to hair which is wound around the winder, said winder comprising a substantially tubular container having one open end and an opposite closed end, a hollow heat conductive sleeve in the container having an open end located at the open end of the container, said sleeve and container being joined together to define a completely sealed space therebetween, said sleeve having a higher thermal conductivity than that of said container, said sleeve having an inner surface of substantially the same contour as that of the outer surface of the heating member such that the heating member can be inserted into said sleeve through the open end thereof and the outer surface of the heating member can be placed into intimate contact with the inner surface of the sleeve for the transfer of heat from the heating member to the sleeve, and heat absorbing material completely filling the sealed space between the container and the sleeve and in intimate heat conductive contact therewith; the apparatus further comprising means controlling the magnitude of heat supplied to the heating member such that a temperature of between 60 and 130° C. may be reached by the heat absorbing material, said absorbing material being fusible within the latter temperature range and having a high latent heat of fusion.

2. Apparatus as claimed in claim 1, wherein the inner surface of the sleeve and the outer surface of the heating member are conical.

3. Apparatus as claimed in claim 1, wherein the sleeve and the heating member are aluminum.

4. Apparatus as claimed in claim 2, wherein the outer surface of the sleeve in contact with the heat-absorbing material is conical.

5. Apparatus as claimed in claim 1, comprising a flange on the sleeve at the open end thereof in engagement with the container to limit the opening at said open end of the container to the opening in the sleeve.

6. Apparatus as claimed in claim 1, wherein the means for heating the heating member comprises a casing, an electric heating element within the casing, and means for supplying electric current to the electric heating element to heat the same and thereby the surrounding casing, said heating member having one end in heat conducting relationship with the casing.

7. Apparatus as claimed in claim 6, wherein the means controlling the magnitude of heat supplied to the heating member comprises a thermostat connected in series with the electric heating element and adjusted such that the thermostat cuts off the supply of electric current to the electric heating element when the heating member has attained a temperature at which the heat absorbing material has attained its prescribed temperature.

8. Apparatus as claimed in claim 1 comprising a layer of heat sensitive pigment on the closed end of the container having a color change temperature corresponding to the limit temperature of the heat absorbing material.

9. Apparatus as claimed in claim 1, wherein the heat-absorbing material has a heat fusion of about 80 cal./g.

10. Apparatus as claimed in claim 9, wherein said heat-absorbing material is erythrite.

11. Apparatus as claimed in claim 1, comprising corrugations extending along the outer surface of the container.

12. Apparatus as claimed in claim 1, wherein said container is constituted of material having a relatively low coefficient of thermal conductivity to provide a temperature on the outside surface of the container between 40 and 60° C. when the temperature of the heat-absorbing material is between 60 and 130° C.

13. Apparatus as claimed in claim 1, wherein said sleeve extends within said container only along a portion of the length thereof.

*14. A hair winder adapted to be heated for transferring heat to hair which is wound around the winder, said winder comprising:*

*(a) a substantially tubular container, the outer surface of said container being adapted to have hair wound thereon,*

*(b) a hollow heat conductive sleeve disposed within and spaced from the inner surface of said container to form a space between said sleeve and said container, said sleeve having a major axis extending parallel to the longitudinal axis of said tubular container, the axial length of said sleeve extending along a major portion of the axial length of said container,*

*(c) means for completely sealing said space between said sleeve and said container,*

*(d) the thermal conductivity of said sleeve being substantially higher than the thermal conductivity of said outer surface of said container,*

*(e) said container and said sleeve having at least one open end to permit a heating member to be inserted into said hollow heat conductive sleeve to be placed in intimate heat conductive contact with said sleeve, and*

*(f) heat absorbing material filling a major portion of said sealed space, said heat absorbing material being in heat conductive contact with said sleeve and said container,*

*(g) said heat absorbing material being fusible within the temperature range between 60 and 130° C.*

*15. The hair winder of claim 14 wherein said hollow heat conductive sleeve extends along substantially the entire axial length of said container.*

*16. The hair winder of claim 14 wherein said completely sealed space between said sleeve and said container is a substantially annular space.*

*17. The hair winder of claim 14 wherein said heat absorbing material has a high latent heat of fusion.*

*18. A hair winder adapted to be heated for transferring heat to hair which is wound around the winder, said winder comprising:*

*(a) a substantially tubular container, the outer surface of said container being adapted to have hair wound thereon,*

*(b) a hollow heat conductive sleeve disposed within and spaced from the inner surface of said container to form a substantially annular space within said container, said sleeve having a major axis extending parallel to the longitudinal axis of said tubular container, the axial length of said sleeve extending along substantially the axial length of said container,*

*(c) means for completely sealing said annular space within said container,*

*(d) the thermal conductivity of said sleeve being substantially higher than the thermal conductivity of said outer surface of said container,*

*(e) said container and said sleeve having at least one open end to permit a heating member to be inserted into said hollow heat conductive sleeve to be placed in intimate heat conductive contact with said sleeve, and*

*(f) heat absorbing material filling a major portion of said sealed space, said heat absorbing material being in heat conductive contact with said sleeve and said container,*

*(g) said heat absorbing material being fusible within the temperature range between 60 and 130° C., and*

*(h) said heat absorbing material having a high latent heat of fusion.*

References Cited

The following references, cited by the Examiner, are of record in the patented file of this patent or the original patent.

UNITED STATES PATENTS

| | | | |
|---|---|---|---|
| Re. 18,088 | 6/1931 | Boyden. | |
| 2,166,810 | 7/1939 | Gammeter. | |
| 2,584,999 | 2/1952 | Flournoy | 132—37 |
| 2,791,204 | 5/1957 | Andrus. | |
| 3,103,934 | 9/1963 | Sabourin | 132—33 |
| 1,644,255 | 10/1927 | Kercher et al. | |
| 1,693,369 | 11/1928 | Cochran | 73—356 X |
| 2,084,951 | 6/1937 | Engele | 219—222 X |
| 2,126,170 | 8/1938 | Calvete | 132—36 X |
| 2,525,274 | 10/1950 | Schleimer | 219—242 |

FOREIGN PATENTS

| | | |
|---|---|---|
| 637,832 | 11/1936 | Germany. |
| 440,000 | 12/1935 | Great Britain. |

ANTHONY BARTIS, Primary Examiner

U.S. Cl. X.R.

126—400; 132—33; 219—242, 523

UNITED STATES PATENT OFFICE

CERTIFICATE OF CORRECTION

Reissue No. 26,766 January 13, 1970

Niels Christian Jorgensen

It is certified that error appears in the above identified patent and that said Letters Patent are hereby corrected as shown below:

In the heading to the printed specification, lines 4 and 5, "assignor to Arne B. Pedersen, Bryggergarden, Kalundborg, Denmark" should read -- assignor, by mesne assignments, to Bristol-Myers Company, New York, N. Y., a corporation of Delaware --.

Signed and sealed this 16th day of February 1971.

(SEAL)
Attest:

Edward M. Fletcher, Jr.
Attesting Officer

WILLIAM E. SCHUYLER, JR.
Commissioner of Patents